April 18, 1950 M. S. CURTIS ET AL 2,504,306
CHANGE-SPEED MECHANISM FOR MACHINE TOOLS
Filed May 3, 1946
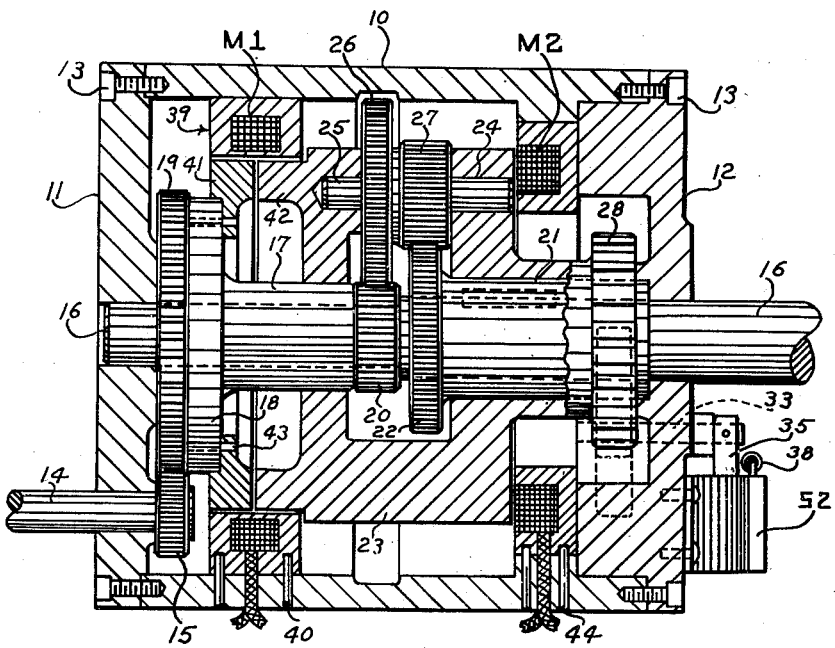
Fig. 1
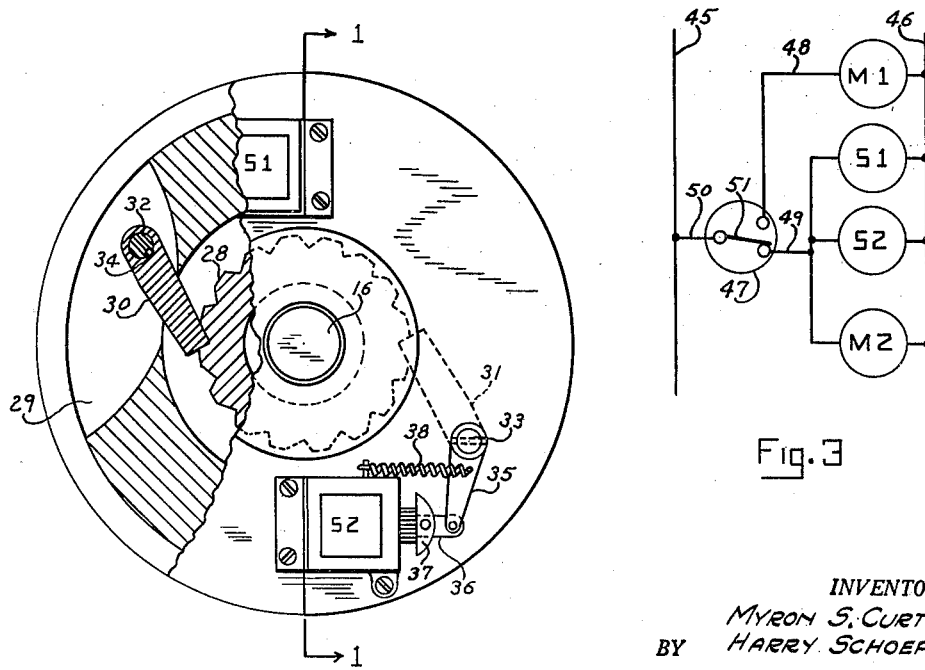
Fig. 2
Fig. 3
INVENTORS
MYRON S. CURTIS
BY HARRY SCHOEPE
Kwis, Hudson, Boughton & Williams
ATTORNEYS Patented Apr. 18, 1950

2,504,306

UNITED STATES PATENT OFFICE 2,504,306

CHANGE-SPEED MECHANISM FOR MACHINE TOOLS

Myron S. Curtis and Harry Schoepe, Cleveland, Ohio, assignors to The Warner & Swasey Company, Cleveland, Ohio, a corporation of Ohio Application May 3, 1946, Serial No. 666,987

11 Claims. (Cl. 74—789)

This invention relates to a change-speed mechanism particularly useful for providing a plurality of speeds for moving parts of machine tools or the like, and it is the prinicpal object of the invention to provide an improved means for effecting the speed changes whereby a relatively small compact mechanism is effective in transmission of heavy torque loads.

It is also an object of the invention to provide a change-speed mechanism for a machine tool wherein electrical means are employed for effecting the speed change, the said electrical means including an electrically operated mechanical device for preventing reverse rotation of a part of the mechanism.

A further object of the invention is to provide a change-speed device including epicyclic gearing with improved means for allowing or preventing rotation of the carrier for the epicycloidal gears to thereby provide a plurality of driving speeds for a part of a machine tool.

A still further object of the invention is to provide a change-speed mechanism employing epicyclic gearing with electromagnetic means for stopping the rotation of the carrier for the epicycloidal gears and tending to hold it against rotation, and also to provide the said mechanism with electrically operated mechanical means for preventing reverse rotation of the said carrier due to torque reaction under heavy loads, whereby the electromagnetic means for preventing rotation may be much smaller than that needed when it is the sole holding means.

An additional object of the invention is to provide a change-speed mechanism for a machine tool or the like, employing epicyclic gearing, with an improved electromagnetic clutch for engagement of the carrier of the gearing for bodily rotation to provide one speed for the mechanism, improved electrical means for stopping and holding said carrier stationary to provide a different speed of rotation for the mechanism, and circuit means for selective energization of said clutch and electrical means..

Further objects and advantages of the invention will become apparent from the following detailed description of one embodiment of the invention and from the claims appended thereto.

In the drawings:

Fig. 1 is a longitudinal sectional view through the improved change-speed mechanism of the invention, the section being taken substantially on the section indicating line 1—1 of Fig. 2 and looking in the direction of the arrows;

Fig. 2 is an end view of the mechanism illustrated in Fig. 1 taken from the right side thereof, with a portion of the housing broken away and parts shown in section; and Fig. 3 is a schematic diagram of the electrical circuit employed to operate the change-speed mechanism.

We have disclosed the invention as embodied in a change-speed mechanism interposed between a driving and driven shaft to provide a means for easily changing the speed of movable parts of machine tools and other devices. In order to simplify the disclosure, the connections of the driving and driven shafts of the apparatus to the prime mover and the machine tool are not shown since these do not form a part of this invention.

One embodiment of the change speed mechanism, as illustrated in the drawings, is contained within a housing or support which is here shown as formed by a cylindrical member 10 having end enclosure members 11 and 12 attached thereto by means of suitable screws or other fastening means 13. The closure 11 has an opening and a boss formed thereabout for journalling a driving shaft 14, which has a gear 15 affixed to its inner end within the support or housing. The end closure 11 is also provided with a suitable bore and boss for journalling one end of the driven member or shaft 16, the other end of which extends through a suitable opening and boss forming a journal in the end closure 12. Journalled on the driven member or shaft 16 is a sleeve 17, which has an enlarged portion 18 at one end thereof to which a gear 19 is attached or integrally formed thereon, the gear 19 running in mesh with the aforementioned gear 15. The other end of sleeve 17 is provided with a gear 20 (attached to the sleeve or formed integrally therewith) which constitutes a sun gear for an epicyclic gearing system subsequently to be described. The particular epicyclic gearing illustrated is the type commonly known as planetary, but it will be apparent that other epicyclic systems may be employed.

The shaft 16 is further provided with a sleeve 21, which is keyed or otherwise connected to the said driven shaft 16 for rotation therewith. The inner end of sleeve 21 is provided with a gear 22 which constitutes a second sun gear for the epicyclic gearing. Rotatably journalled upon the sleeves 17 and 21 is a carrier 23 for the epicyclic or planetary gearing system. In addition to rotation, the carrier is also capable of a slight axial movement upon the sleeves 17 and 21. This carrier 23 is provided with a bore 24 in which is mounted a shaft 25 on which are carried integral epicycloidal or planetary gears 26 and 27 rotatable on said shaft and meshing with the sun gears 20 and 22, respectively. While only one pair of epicycloidal or planetary gears 26 and 27 has been shown, it will be appreciated that a plurality of such gears may be, and generally are, provided at spaced points around the carrier 23 in mesh with the sun gears to equalize the load on the bearings. The epicyclic gear carrier 23 is provided adjacent one end thereof with a serrated member or ratchet wheel 28, which may be formed integrally therewith or connected thereto by any suitable means.

The end closure member 12 is provided with recessed portions 29 (see Fig. 2) in which are disposed pawls 30 and 31, the width of the recessed portions 29 being substantially the same as, or slightly greater than, the width of the pawls so that the said pawls may freely rock therein. The pawls 30 and 31 are supported for rocking movement by means of pivot shafts 32 and 33, which extend through the end closure member 12, and suitable bosses provided thereon, with the inner ends of the said shafts supported in the portion of the closure member on the other side of the recesses 29. The pawls are connected to the pivot shafts for rocking therewith by keys 34 or other suitable fastening means.

The outer end of the shafts 32 and 33 extend beyond the bosses provided on the end closure 12 and have rocker arms 35 keyed or otherwise attached thereto. The lower end of each of these rocker arms 35 is connected by a link 36 to the corresponding armature 37 of the solenoids S1 and S2, respectively, mounted upon the outer face of the end closure 12. These solenoids are of the repulsion type so that when they are energized the armatures 37 move outwardly, thereby rocking arms 35 and the pawls 30, 31 in a direction to move the latter inwardly into contact with the teeth of the serrated member or ratchet wheel 28. Tension springs 38 are connected between the arms 35 and the solenoid housings for rocking the arms 35 and the pawls 30, 31, when the solenoids are de-energized, so as to move the said pawls out of contact with the teeth of the serrated member 28. It will be observed that the teeth of the serrated member 28 are so formed that when the pawls 30 and 31 are in contact therewith and the serrated member is rotating in a counter-clockwise direction, as viewed in Fig. 2, the pawls will latch idly thereover. However, when the pawls are in contact with the serrated member, and the rotation thereof is in a clockwise direction, the pawls will drop into the teeth and prevent the said rotation.

In order to effect the selective use of the several gears previously described, further electrical means are provided for selectively clutching the gear 19 to the epicyclic gearing carrier 23, and for stopping the rotation of the latter carrier when the said clutching means is de-energized. As shown in Fig. 1, 39 denotes an electromagnetic clutch which comprises a ring type electromagnet M1 mounted within the support or housing 10 and connected thereto by any suitable means, as for example, by the pins 40. Cooperating with this electromagnet M1 are armature members 41 and 42 connected respectively with the gear 19 and the carrier 23. These armature members are cylindrical so that their outer circumferences are in close proximity to the inner face of the electromagnet M1, but with sufficient clearance for free rotation therein. The armature element 41 may be integral with the enlarged portion 18 or may be separate therefrom and connected thereto by suitable means, such as pins 43, screws, or other fastening means. Likewise, the armature member 42 may be either formed integrally with the carrier 23 or a separate member attached thereto. The adjacent faces of the armature members 41 and 42 are spaced sufficiently to permit free rotation.

There is thus provided a flux path for the electromagnet M1 through the said armature members 41 and 42 so that, when the electromagnet M1 is energized, the armature members 41 and 42 will be drawn together by the magnetic lines of force, since the carrier 23 is capable of a slight axial movement, as stated above. The members 41 and 42 being held in frictional engagement by the magnetic lines of force, the carrier 23 and its gears 26 and 27 will rotate bodily with the gear 19. The drive then is from the driving shaft 14 through gears 15 and 19 to the driven shaft 16, the epicycloidal or planetary gears 26 and 27 thus acting like keys for transmitting the rotation of gear 20 to gear 22. A change of speed is effected by de-energizing the electromagnetic clutch 39 so that the gear 19 no longer carries with it the carrier and epicycloidal gears as a unit. It then is necessary to stop the rotation of the carrier 23 and hold it stationary so that the drive will be from shaft 14, gear 15, gear 19, sun gear 20, planetary gears 26, 27 and sun gear 22 to the shaft 16. Stopping and partial holding of the carrier 23 is effected by an electromagnet M2, which is circular and mounted within the support 10 by suitable fastening means 44 so that the front face of the said electromagnet M2 is closely adjacent a portion of the end of carrier 23, which then acts as the armature for the electromagnet M2. Hence, when the electromagnet M2 is energized, it will cause the carrier 23 to move slightly in an axial direction bringing it into frictional engagement with the said electromagnet M2 which thus acts as an electromagnetic brake. This tends to stop the rotation of the carrier and to hold it stationary. Obviously, the electromagnet M2 may be of sufficient size to hold the carrier 23 against rotation without assistance. However, since the gear ratios between gears 15, 19, 20, 26, 27 and 22 are such as to produce a large speed reduction, and consequently a heavy torque transmittal, the reaction of this torque upon the carrier 23 would require an electromagnet of a very large size. In order that a relatively small electromagnet M2 may be employed and still maintain the large gear reduction and resulting torque reactions, the aforementioned serrated member and cooperating pawl mechanism has been provided to assist the electromagnet M2 in its function of positively holding the carriage stationary.

Referring now to Fig. 3, there is shown an electrical circuit for operating the several electromagnets and solenoids to change the speeds through the mechanism previously described. Power is supplied to the device by the power lines 45 and 46 with the electromagnets M1 and M2 and solenoids S1 and S2 each having one connection extending to the power line 46. The circuit is selectively completed to the line 45 through the single pole double throw switch 47 by means of the wires 48, 49, 50 and switch blade 51. The wire 48 connects electromagnet M1 to one pole of the switch 47 while the solenoids S1 and S2 and electromagnet M2 are connected in parallel to the other pole of switch 47 by the wire 49. The blade 51 of switch 47 is movable between the two poles of the switch for selective connection thereof to the power line 45 through the wire 50.

In the position of the switch as shown in Fig. 3, electromagnet M2 and solenoids S1 and S2 are energized so that the carrier 23 is prevented from rotation by the said electromagnet M2 and by the engagement of the pawls 30 and 31 with the ratchet wheel or serrated member 28. When the switch 47 is operated to its other position, the electromagnet M2 and the solenoids S1 and S2 are de-energized, thus allowing the springs 38 to retract the pawls from engagement with the teeth of the serrated member and freeing the carrier 23 for rotation. The energization of the electromagnet M1 then clutches the gear 19 with the carrier 23 for rotation therewith.

The operation of the device may be summarized as follows. With the blade of switch 47 thrown to its upper position for energization of electromagnet M1, gear 19 will be magnetically clutched to the carrier 23 so that the drive will be direct, at relatively high speed, from the driving shaft 14, gears 15 and 19 to driven shaft 16, through the carrier 23 which now bodily rotates with gear 19, the epicycloidal gears 26 and 27 then functioning as keys for transmitting the rotation of gear 20 to gear 22. When it is desired to operate at a lower speed, switch 47 is operated to the position in Fig. 3, thus de-energizing electromagnet M1 and energizing electromagnet M2 and solenoids S1 and S2. The de-energization of electromagnet M1 frees the carrier 23 from gear 19 and the energization of the electromagnet M2 renders the latter effective to slow down and stop the rotation of the carrier. For the purposes of this disclosure, we will assume that the previously mentioned rotation of the carrier at the higher speed when the electromagnet M1 was energized was in the counter-clockwise direction as seen in Fig. 2. Hence, when the switch 47 is operated to the position illustrated in Fig. 3 (energizing solenoids S1 and S2 simultaneously with the electromagnet M2), the pawls 30, 31 will be rocked into contact with the teeth of the serrated member 28 before the rotation thereof has ceased. However, it will be observed that this counter-clockwise rotation will simply cause the pawls to ride idly over the teeth until the member 28 stops. When the load is applied upon the shaft 16, however, the resulting heavy torque reaction will tend to cause the carrier 23 to reverse its direction of rotation so that it will now tend to rotate in a clockwise direction since the electromagnet M2 is not of sufficient strength to hold the carrier stationary when subjected to heavy torque reaction. This clockwise rotation will permit the ends of pawls 30 and 31 to drop into the teeth of the serrated member and positively hold it from the said reverse rotation. The drive is then from the shaft 14 through gears 15, 19, 20, 26, 27, 22 and the sleeve 21 to the shaft 16.

While the operation just described has assumed that the high speed drive is employed first, it will be apparent that the action of the mechanism is not altered if the order of operation be reversed. Thus, if the switch blade 51 is in the position illustrated in Fig. 3 when power is first applied to driving shaft 14, the carrier will be initially stationary and the electromagnet M2 will tend to hold it from rotation. Assuming the shaft 16 (as seen in Fig. 2) is driven in a counter-clockwise direction, the torque reaction will tend to cause the carrier 23 to rotate in a clockwise direction. Since the electromagnet M2 is relatively small, it will not completely prevent this rotation of carrier 23 under heavy torque loads. However, at the same time that M2 was energized the solenoids S1 and S2 were also energized rocking pawls 30 and 31 into contact with the serrated member 28 to positively hold it and the carrier from rotation due to torque reaction. If the ends of the pawls should strike the high portions between the teeth of the serrated member 28 when initially moved by the solenoids S1 and S2, they will, nevertheless, drop into the tooth-like recesses upon a slight clockwise rotation of the carrier and member 28 and thereafter prevent further rotation so that driving of shaft 16 is through the epicyclic gearing system.

When the blade 51 of switch 47 is then thrown to its upper position (Fig. 3), the solenoids S1, S2 and electromagnet M2 are de-energized, thus freeing the carrier 23 and serrated member 28 for rotation. The accompanying energization of electromagnet M1 operates the electromagnetic clutch 39 to cause the carrier 23 to move bodily, as a unit, with the gear 19 so that the drive is then from shaft 14 through gears 15 and 19 to shaft 16 as previously described.

While we have described a preferred embodiment of our invention in considerable detail, it will be appreciated that numerous changes and modifications may be made. For example, while the mechanism shown provides only two different speeds, it will be readily apparent that a greater number of speeds may be provided by connecting together two or more of the change speed mechanisms shown. Also, while a separate driving shaft 14 has been shown, the drive could be directly applied to gear 19 by providing a reduced extension on sleeve 17 to the left of gear 19 (as seen in Fig. 1) and connecting the source of power thereto. Hence, the gear 19 may be considered as the driving member for the mechanism and will be so referred to in the claims.

Other modifications and equivalents will be readily apparent to one skilled in the art and, therefore, we do not wish to be confined to the exact construction illustrated but desire to cover all modifications coming within the spirit and scope of our invention as set forth in the appended claims.

Having thus described our invention, we claim:

1. A change-speed mechanism of the type described comprising, a support, a driving member and a driven member journalled in said support, epicyclic gearing connections between the driving member and the driven member, a carrier for a portion of said gearing rotatable relative to said driven member, means to clutch said driving member to the carrier for rotation as a unit to provide one speed of rotation for the driven member, braking means carried by said support and cooperating with the carrier, when operated, to restrain the carrier from rotation thereby rendering the epicyclic gearing effective to provide a different speed of rotation for said driven member, mechanical means for positively holding the said carrier from rotation caused by the torque reaction exerted thereon by the operation of the epicyclic gearing, and a control means for simultaneous actuation of said braking means and said mechanical means.

2. The combination as defined in claim 1 wherein the mechanical means for positively holding the carrier from rotating comprises, a serrated member carried by said carrier, a pawl pivoted on said support and adapted to cooperate with the said serrated member, and means for moving said pawl into engagement with said serrated member.

3. A change-speed mechanism of the type described comprising a driving member; a driven member; gearing connecting said driving and driven members; a portion of said gearing being carried by a rotatable carrier; an electromagnetic clutch adapted to connect said driving member with said carrier for rotation therewith as a unit thereby providing a high speed, low torque rotation of said driven member; a stationary electromagnetic means located adjacent said carrier and adapted, when energized, to restrain the carrier from rotation to provide a low speed, high torque rotation of said driven member; said electromagnetic means being of smaller size than the size necessary to prevent reactionary rotation of said carrier when said high torque loads are applied to the driven member; and electrically operated mechanical means for positively holding said carrier from rotation when said high torque loads are applied to the driven member, whereby a high torque load may be transmitted by a relatively small and compact change speed mechanism.

4. The combination as defined in claim 3 and further comprising an electrical circuit including switching means for selective energization of said electromagnetic clutch, said electromagnetic means, and said electrically operated mechanical means, so constructed and arranged that when said switching means is in one position the electromagnetic clutch is energized and said electromagnetic means and electrically operated mechanical means are de-energized, and when the said switching means is in another position the electromagnetic clutch is de-energized and the electromagnetic means and the electrically operated mechanical means are energized.

5. A change-speed mechanism of the type described comprising, a support, a driving member and a driven member journalled in said support, epicyclic gearing connections between the driving member and the driven member, a carrier for a portion of said gearing rotatable relative to said driven member, means to clutch said driving member to the carrier for rotation as a unit to provide one speed of rotation for the driven member, electromagnetic means carried by said support and cooperating with the carrier, when energized, to restrain the carrier from rotation thereby rendering the epicyclic gearing effective to provide a different speed of rotation for said driven member, and electrically operated mechanical means for positively holding the said carrier from rotation caused by the torque reaction exerted thereon by the operation of the epicyclic gearing.

6. The combination as defined in claim 5 wherein the electrically operated mechanical means for positively holding the carrier from rotating comprises, a serrated member carried by said carrier, a pawl pivoted on said support and adapted to cooperate with the said serrated member, and solenoid means for moving said pawl into engagement with said serrated member.

7. A change speed mechanism of the type described comprising, a support, a driving member and a driven member journalled in said support, epicyclic gearing connections between the driving member and the driven member, a carrier for a portion of said gearing rotatable relative to said driven member, an armature carried by said driving member, an armature on said carrier closely adjacent the armature on said driving member, an electromagnet mounted on said support and surrounding said armatures in a manner such that when the electromagnet is energized the flux path thereof extends through said armatures causing the carrier to be rotated as a unit with the driving member to provide one speed of rotation for said driven member, a second electromagnet carried by said support and cooperating with the carrier when energized to restrain the latter from rotation thereby rendering the epicyclic gearing effective to provide a different speed of rotation for said driven member, and electrically operated mechanical means for positively holding the said carrier from rotation caused by the torque reaction exerted thereon by the operation of the epicyclic gearing.

8. A change speed mechanism of the type described comprising, a support, a driven member journalled in said support, a driving member journalled on said driven member, a sleeve carried by and connected to said driven member, epicyclic gearing between said driving member and said sleeve, said gearing including a gear carrier rotatably mounted on said driving member and said sleeve, an armature carried by said driving member, an armature on one end of said carrier closely adjacent the armature on said driving member, an electromagnet mounted on said support and surrounding said armatures in a manner such that when the electromagnet is energized the flux path thereof extends through said armatures causing the carrier to be rotated as a unit with the driving member to provide one speed of rotation for said driven member, a second electromagnet mounted on said support adjacent the other end of the carrier, the said other end of the carrier constituting an armature for the said second electromagnet whereby energization of the latter will restrain the carrier from rotation thereby rendering the epicyclic gearing effective to provide a different speed of rotation for said driven member, and electrically operated mechanical means for positively holding the said carrier from rotation caused by the torque reaction exerted thereon by the operation of the epicyclic gearing.

9. The combination as defined in claim 8 wherein the electrically operated mechanical means for positively holding the carrier from rotating comprises, a serrated member carried by said carrier, a pawl pivoted on said support and adapted to cooperate with the said serrated member, and solenoid means for moving said pawl into engagement with said serrated member.

10. A change speed mechanism of the type described comprising, a support, a driving member and a driven member journalled in said support, epicyclic gearing connections between the driving member and the driven member, a carrier for a portion of said gearing rotatable relative to said driven member, an armature carried by said driving member, an armature on one end of said carrier closely adjacent the armature on said driving member, an electromagnet mounted on said support and surrounding said armatures in a manner such that when said electromagnet is energized the flux path thereof extends through said armatures causing the carrier to be rotated as a unit with the driving member to provide one speed of rotation for said driven member, electromagnetic means carried by said support and cooperating with the other end of said carrier, when energized, to restrain the latter from rotation thereby rendering the epicyclic gearing effective to provide a different speed of rotation for said driven member, electrically operated mechanical means for positively holding the said carrier from rotation caused by the torque reaction exerted thereon by the operation of the epicyclic gearing, and an electric circuit including switching means for selective energization of said electromagnet, said electromagnetic means, and said electrically operated mechanical means so constructed and arranged that when said switching means is in one position the electromagnet is energized and said electromagnetic means and electrically operated mechanical means are de-energized, and when the said switching means is in another position the electromagnet is de-energized and the electromagnetic means and electrically operated mechanical means are energized.

11. A change speed mechanism of the type described comprising a driving member; a driven member; gearing including a rotatable carrier connecting said driving and driven members with a portion of said gearing carried by a rotatable carrier; means to clutch said driving member with said carrier for rotation therewith as said unit thereby providing a high speed low torque rotation of said driven member; braking means including a stationary member adapted to frictionally cooperate with a portion of said carrier to bring the latter to rest and hold it from rotation thereby providing a low speed high torque rotation of said driven member; said braking means being of smaller capacity than the capacity necessary to prevent reactionary rotation of said carrier when said high torque loads are applied to the driven member; and mechanical means for positively holding said carrier from said reactionary rotation when said high torque loads are applied to the driven member and the holding capacity of said braking means is exceeded, whereby a high torque load may be transmitted by a relatively small and compact change speed mechanism.

MYRON S. CURTIS.
HARRY SCHOEPE.

REFERENCES CITED

The following references are of record in the file of this patent:

UNITED STATES PATENTS

| Number | Name | Date |
|---|---|---|
| 796,828 | Dyer | Aug. 8, 1905 |
| 894,878 | Cutler | Aug. 4, 1908 |
| 961,107 | Dahl et al. | June 14, 1910 |
| 1,648,479 | Hilbert | Nov. 8, 1927 |
| 1,863,110 | Salerni | June 14, 1932 |

FOREIGN PATENTS

| Number | Country | Date |
|---|---|---|
| 9,111 | Great Britain | Apr. 19, 1902 |
| 777,259 | France | Nov. 26, 1934 |
| 823,798 | France | June 20, 1937 |